United States Patent [19]
Robb

[11] Patent Number: 5,786,940
[45] Date of Patent: Jul. 28, 1998

[54] OPTICAL SYSTEM DESIGN OPTIMIZATION USING AN ANALYTICAL FIGURE OF MERIT

[75] Inventor: Paul N. Robb, Sunnyvale, Calif.

[73] Assignee: Lockheed Martin Corp., Sunnyvale, Calif.

[21] Appl. No.: 767,939

[22] Filed: Dec. 17, 1996

[51] Int. Cl.$^6$ .................................................. G02B 9/14
[52] U.S. Cl. ........................................... 359/637; 359/796
[58] Field of Search .............................. 359/637, 796, 359/793, 754

[56] References Cited

U.S. PATENT DOCUMENTS

| | | | |
|---|---|---|---|
| 4,790,637 | 12/1988 | Mercado et al. | 350/444 |
| 4,832,472 | 5/1989 | Robb | 350/463 |
| 4,911,538 | 3/1990 | Robb | 350/418 |
| 4,950,041 | 8/1990 | Robb | 350/418 |
| 5,204,782 | 4/1993 | Mercado et al. | 359/786 |
| 5,210,646 | 5/1993 | Mercado et al. | 359/793 |
| 5,436,763 | 7/1995 | Chen et al. | 359/565 |

OTHER PUBLICATIONS

Roland V. Shack, "Abberation (optics)", McGraw Hill Encyclopedia of Physics, $2^{nd}$ Edition, 1993, pp. 2–7.
Herzberger, M., "Lens", McGraw Hill Encyclopedia of Physics, $2^{nd}$ Edition, 1993, pp. 673–676.
Shack, R.V., "Geometricla Optics", McGraw Hill Encyclopedia of Physics, $2^{nd}$ Edition, 1993, pp. 484–489.
Robb, P.N., "Selection of Optical Glasses", SPIE, vol. 554, International Lens Design Conference (1985), pp. 60–75.

*Primary Examiner*—Frank G. Font
*Assistant Examiner*—Michael Stafira
*Attorney, Agent, or Firm*—Feix & Feix

[57] ABSTRACT

Analytical optical system design optimization implements an optical material selection module (302), a thin lens power calculation module (304), a prescription module (306), a figure of merit determination module (308), a bending adjustment module (310), and a focal length scaling module (312). The optical material selection module (302) selects a set of optical materials that are appropriate for use together in an optical system using the dispersion coefficients of the materials. Potential optical designs are screened according to thin lens power criteria. For each design with acceptable power distribution, a lens prescription is arranged and thickness is added to each lens by the prescription module (306) to provide a thick lens assembly. Designs can then be analyzed according to a figure of merit that evidences optical system performance by the figure of merit determination module (308). In an exemplary embodiment the polychromatic RMS spot radius for each design is analyzed. The thick lens assembly is then adjusted by the bending adjustment module (310). The assembly is adjusted over bending range to identify the degree of bending at which the design is optimized according to the figure of merit. After optimization according to bending and the figure of merit, the focal length of the lens is calculated and the design is scaled by the focal length scaling module (312) so that various designs can be appropriately compared.

13 Claims, 12 Drawing Sheets

| DESIGN | j | CV(j) | Th(j) | LM(j) | FMT |
|---|---|---|---|---|---|
| 1 | 0 | 0 | Th(0) | AIR | 5.28E−05 |
| | 1 | 2.011 | Th(1) | FKS1 | |
| | 2 | −2.347 | Th(2) | KZFSN4 | |
| | 3 | −0.522 | Th(3) | AIR | |
| | 4 | 0 | Th(4) | IM. PLANE | |
| 2 | 0 | — | — | — | — |
| | 1 | — | — | — | |
| | 2 | — | — | — | |
| | 3 | — | — | — | |
| | 4 | — | — | — | |
| ⋮ | | | | | ⋮ |

| DESIGN | j | CV(j) | Th(j) | LM(j) | FMT |
|---|---|---|---|---|---|
| 1 | 0 | 0 | Th(0) | AIR | 3.54E-05 |
| | 1 | 2.605 | Th(1) | FKS1 | |
| | 2 | -1.733 | Th(2) | KZFSN4 | |
| | 3 | 0.084 | Th(3) | AIR | |
| | 4 | 0 | Th(4) | IM. PLANE | |
| 2 | 0 | — | — | — | — |
| | 1 | — | — | — | |
| | 2 | — | — | — | |
| | 3 | — | — | — | |
| | 4 | — | — | — | |
| ⋮ | | | | | ⋮ |

| DESIGN | j | CV(j) | Th(j) | LM(j) | FMT |
|--------|---|-------|-------|-------|-----|
| 1 | 0 | 0 | Th(0) | AIR | 4.07E−05 |
| | 1 | 2.940 | Th(1) | PKS1 | |
| | 2 | −1.955 | Th(2) | LASF18 | |
| | 3 | 1.341 | Th(3) | SF57 | |
| | 4 | −0.331 | Th(4) | AIR | |
| | 5 | 0 | Th(5) | IM PLANE | |
| 2 | 0 | — | — | — | — |
| | 1 | — | — | — | |
| | 2 | — | — | — | |
| | 3 | — | — | — | |
| | 4 | — | — | — | |
| | 5 | — | — | — | |
| ⋮ | | | | | ⋮ |

| DESIGN | j | CV(j) | Th(j) | LM(j) | FMT |
|---|---|---|---|---|---|
| 1 | 0 | 0 | Th(0) | AIR | 3.04E-06 |
| | 1 | 3.146 | Th(1) | PKS1 | |
| | 2 | −1.732 | Th(2) | LASF18 | |
| | 3 | 1.553 | Th(3) | SF57 | |
| | 4 | −0.114 | Th(4) | AIR | |
| | 5 | 0 | Th(4) | IM. PLANE | |
| 2 | 0 | — | — | — | — |
| | 1 | — | — | — | |
| | 2 | — | — | — | |
| | 3 | — | — | — | |
| | 4 | — | — | — | |
| | 5 | — | — | — | |
| ⋮ | | | | | ⋮ |

FIG. 8B

OPTICAL SYSTEM DESIGN OPTIMIZATION USING AN ANALYTICAL FIGURE OF MERIT

BACKGROUND OF THE INVENTION

1. Field of the Invention

The present invention relates generally to optical systems and more particularly to correction of spherochromatism in systems using combinations of optical materials.

2. Description of the Related Art

Optical systems often comprise several lens elements and perform according to the refractive properties and interrelationship of such elements. One method of designing optical systems is trial and error selection of lens elements and calculation or actual measurement of the performance parameters of lens systems which include the selected elements. However, since there are several manufacturers who each provide a great number of optical materials with a wide array of refractive properties, it is extremely difficult to optimize system design based upon trial and error selection. Therefore, analytical techniques for lens system design without blind selection and measurement, particularly those that could be implemented on a computer system, are sought.

The difficulties in optimizing system design are also affected by departures from ideal optical system behavior referred to as aberrations. Various types of aberrations may be found in optical systems. Monochromatic aberrations apply to a single wavelength of light, while chromatic aberrations change as a function of wavelength or color. An ideal optical system produces a unique image point at a location that corresponds to each object point. Certain aberrations cause the location of the image point to shift off of the ideal focal point. For example, axial chromatic aberration causes the image point to shift axially dependent upon the wavelength of light. Other aberrations, such as spherical aberration, may not cause such paraxial focal shift, but, rather, cause the point images themselves to become aberrated. Spherical aberration may be monochromatic or, alternatively, may vary dependent upon the color or wavelength of light. Spherochromatism is the chromatic variation of spherical aberration.

Certain analytical models have been provided for correcting paraxial focal shift as a function of wavelength. For example, U.S. Pat. No. 5,020,889 to Romeo I. Mercado and Paul N. Robb, entitled "Color-Corrected Optical Systems" describes a method for selecting optical materials in the design of color corrected optical systems wherein axial color correction at three or more wavelengths using only two different optical materials is provided. While paraxial correction generally produces designs with good focal point properties, in actual performance certain designs produce images which are less than optimal because of spherical aberration and the chromatic variation of spherical aberration. This is because, while designs which are selected using paraxial correction prevent images from shifting off of the focal point, they do not account for spherical aberration. Although paraxial correction may incidentally provide correction for spherical aberration, such correction is not generally provided for and certainly not guaranteed.

Thus, there is a need for analytical selection of lenses and optical designs with performance characteristics that do not degrade over a selected bandwidth and for computer implementation of such analytical selection.

SUMMARY OF THE INVENTION

The present invention overcomes the limitations and shortcomings of the prior art with a system, apparatus and method for optimizing optical system design which incorporates correction for spherical aberration and spherochromatism.

In accordance with the present invention, groups of two or more refracting optical materials are employed in an optical system that is optimized both for paraxial focal shift as well as for departures from ideal performance. In an exemplary embodiment correction for paraxial focal shift and spherical aberration including spherochromatism is provided by design optimization using an analytical figure of merit that anticipates real performance.

A set of optical materials is selected (505) by analyzing the dispersion coefficients of the materials. For doublet designs, the primary and secondary dispersion coefficients of optical materials are used to select them. For triplets, the tertiary dispersion coefficients are also used. Those optical materials that fall within a selected region in the space defined by the dispersion coefficients (i.e. the primary, secondary and, for triplets, tertiary coefficients form respective orthogonal axes that define the space) are considered to be appropriate for use with each other in an optical design. Designs are selected from the set of optical materials defined according to the dispersion coefficients and then are analyzed (510) according to their thin lens power distribution so that designs with undesirable power distributions are screened from selection.

The designs with acceptable power distributions are then optimized. First, a lens prescription is arranged (520) and lens thickness is added to the lens elements in a design according to conventional optical techniques. Arrangement of the prescription and thickness addition provides a thick lens assembly that can be analyzed according to performance based criteria. An analytical figure of merit that evidences design performance is identified and the figure of merit for the optical design is calculated (525). In an exemplary embodiment the polychromatic RMS spot radius for the design is analytically determined using calculations that approximate the image plane ray height as a function of wavelength. The bending of the thick lens assembly is adjusted (530) and the figure of merit is determined over a lens assembly bending range to the point or points of optimum performance over the range. In an exemplary embodiment, the design is optimized by determining the degree of bending that provides the lowest polychromatic RMS spot radius. Bending adjustment can cause a slight shift of the focal length. Therefore, the focal length of the thick lens assembly is calculated and the optical design is scaled (535). Scaling each design uniformly also accommodates design comparison. The optimized design prescription and its performance parameters are then stored (540) to allow comparison to other optical designs, which can also be optimized by the steps described above.

Selection of optical materials that are appropriate for use together in a design using their dispersion coefficients and screening potential designs for power distribution criteria provides an initial screening of undesirable designs. By setting up a lens prescription and adding thickness to the lens elements of the desirable designs to provide a thick lens assembly and then analytically optimizing the designs by tracking a figure of merit over a thick lens assembly bending range, analytical design optimization that is reproduced in actual performance is also provided. In the exemplary embodiment wherein the polychromatic RMS spot radius is used as the figure of merit, departures from ideal optical system behavior such as spherical aberration including spherochromatism are consistently and predictably avoided in optimized designs.

The design optimization method in accordance with the present invention is performed analytically. Thus, it is not reliant upon blind selection and calculation or actual measurement of performance parameters. The design optimization method also avoids extensive ray tracing to measure expected performance and thereby allows design optimization for thousands of possible combinations. Furthermore, the design optimization method is implemented on a computer system. Particularly, a preferred design optimization module (210) module includes an optical material selection module (302), a thin lens power calculation module (304), a prescription module (306), a figure of merit determination module (308), a bending adjustment module (310) and a focal length scaling module (312). The optical material selection module (302) and thin lens power calculation module (304) include routines for selecting optical materials that are appropriate for use together in optical designs and for calculating the thin lens power to screen undesirable designs, and the prescription module (306) includes routines for arranging lens prescriptions and converting lens elements from thin to thick for analysis as a thick lens assembly. The figure of merit determination module (308) and the bending adjustment module (310) communicate to determine the degree of bending that offers optimized design performance in view of the figure of merit. The prescription for an optimized design and the corresponding performance parameters can be stored in an optical design selection (206) module for comparison to other designs.

Thus, the present invention offers analytical design optimization that includes correction for and prevents departures from ideal optical behavior in actual performance. Additionally, the design optimization is readily implemented on a computer system.

BRIEF DESCRIPTION OF THE DRAWINGS

These and other more detailed and specific objects and features of the present invention are more fully disclosed in the following specification, reference being had to the accompanying drawings, in which:

FIGS. 7A and 7B are exemplary tables illustrating data stored in the optimization of doublet designs in accordance with the present invention.

FIGS. 8A and 8B are exemplary tables illustrating data stored in the optimization of triplet designs in accordance with the present invention.

DESCRIPTION OF THE PREFERRED EMBODIMENTS

Figure 1:
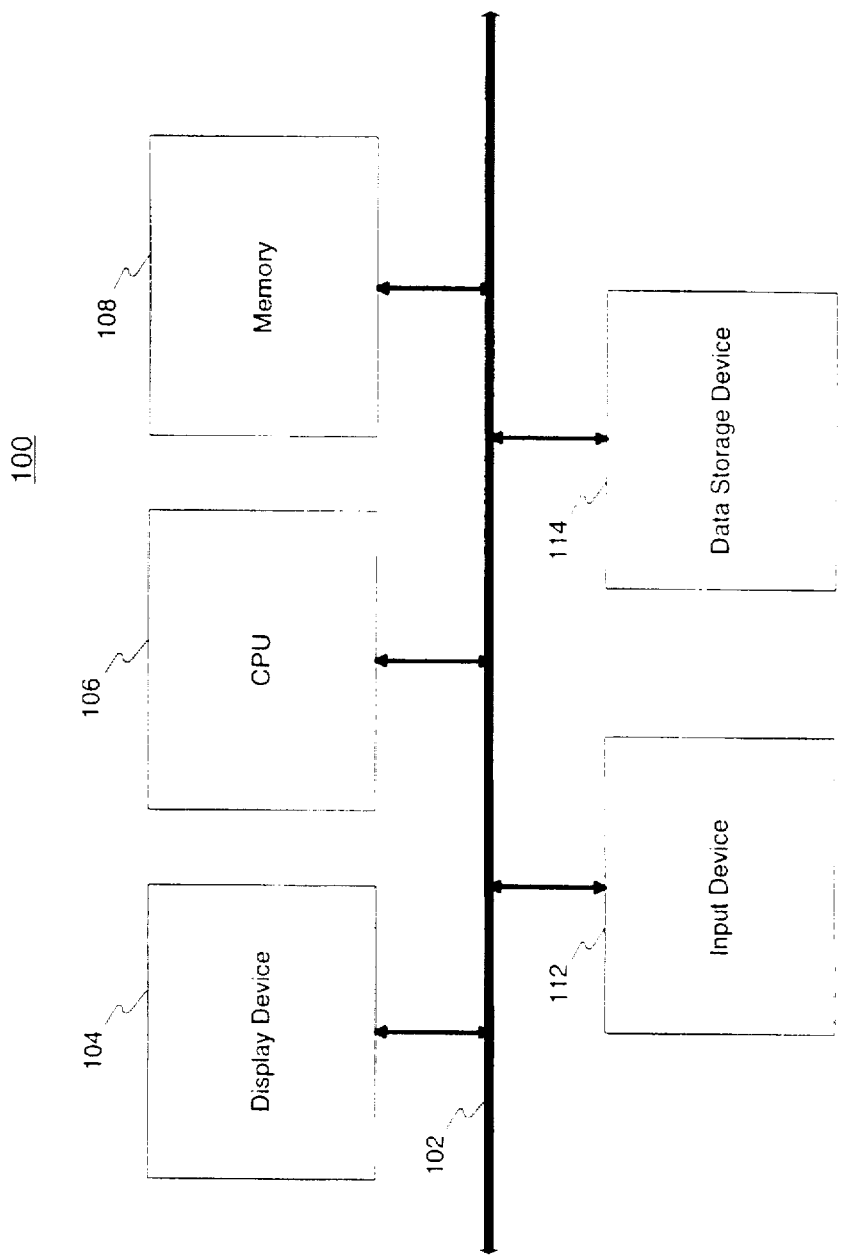
FIG. 1 is a block diagram illustrating a computer system including a preferred embodiment of optical design optimization in accordance with the present invention.

Referring now to FIG. 1, a block diagram of a computer system including a preferred embodiment of optical system design optimization in accordance with the present invention includes a display device 104, a central processing unit (CPU) 106, a memory 108, an input device 112, and a data storage device 114. The CPU 106 is connected by a bus 102 to the display device 104, memory 108, input device 112, and data storage device 114 in a von Neumann architecture. The CPU 106 is preferably a microprocessor such as a Pentium type processor as manufactured by Intel, Inc. of Santa Clara, Calif., the display device 104 is preferably a video monitor, the data storage device 114 is preferably a hard disk, and the input device 110 preferably includes a keyboard and mouse. The memory 108 is preferably a random access memory (RAM), but may also be a read only memory (ROM) or a combination of both RAM and ROM. The CPU 106, input device 112, display device 104, data storage device 114 and memory 108 may be arranged to communicate in a conventional manner such as in a personal computer but it is understood that other configurations, such as a mainframe computer, may be implemented. It is also understood that the CPU may be other processor types.

The CPU 106, under the instructions received from the memory 108 as configured by the user through the input device 312, provides signals for determining optimal optical material combinations and, particularly, correcting combinations for spherochromatism.

Figure 2:
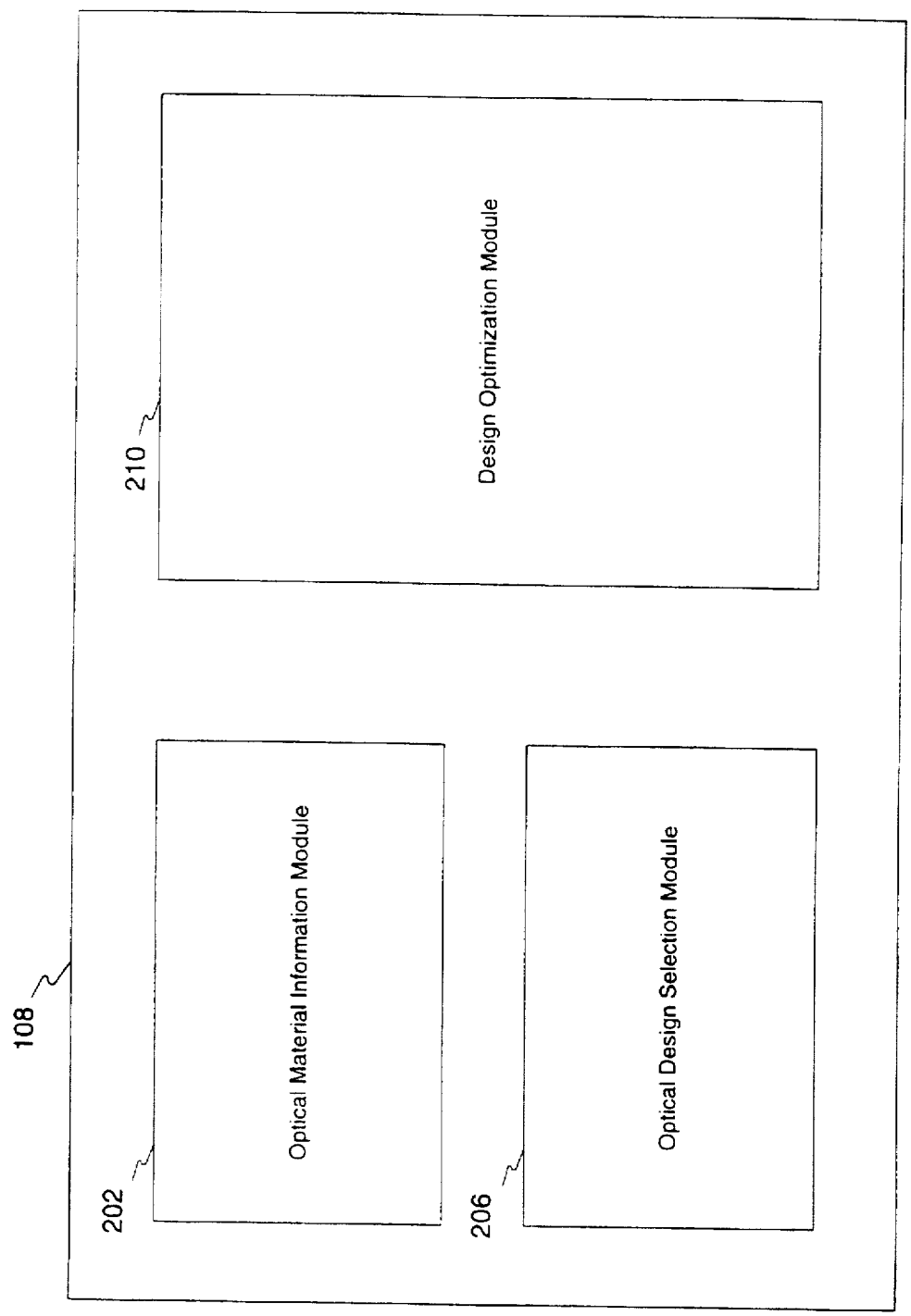
FIG. 2 is a block diagram illustrating a preferred embodiment of a memory including a preferred embodiment of optical design optimization in accordance with the present invention.

Referring now to the block diagram of FIG. 2, the memory 108 with optical system design optimization in accordance with the present invention includes an optical material information module 202, optical design selection module 206, and a design optimization module 210.

The optical material information module 202 stores data identifying various optical materials such as optical glasses as well as data related to each optical glass. For example, catalog data from optical glass manufacturers such as Schott Optical Glass, Inc., Duryea, Pa.; Ohara Optical Glass Mfg. Co., Ltd., Sagamihara, Japan; Hoya Corporation, Tokyo, Japan; Corning-France, Avon, France; and Chance Pilkington Ltd., St. Asaph, Clwyd, U.K may be stored in the optical material parameter data buffer 202. In addition to parameters associated with the performance of each optical material, the module 202 may store information such as cost, availability and fabricability so that factors other than performance may be used in the design of optical systems.

The optical design selection module 206 stores information regarding potential optical designs so that they may be analyzed for design optimization. Information such as the number of optical materials in the system, the types of optical materials, and design parameters regarding the arrangement and function of the optical materials and the optical system is preferably provided in the selection module 206. Additional information such as the cost and availability of optical materials may be provided in the optical design selection module 206. The design optimization module 210 accesses data for optical materials such as that provided from the optical material parameter module 202 and optimizes the design of optical systems comprised of lenses formed from a plurality of the optical materials. The parameters for designs that are optimized are stored in the optical design selection module 206 so that designs can be compared and selected dependent upon user specifications.

The design optimization module 210 includes modules for analytical optical design optimization. Module 210 is typically implemented in software, but can also be implemented in hardware or firmware. In one embodiment, optical designs are corrected for spherical aberration including spherochromatism. Design optimization is established by analysis of a figure of merit (FMT) that corresponds to optical system performance. Preferably, the FMT corresponds to a selected range of wavelengths and the design is manipulated to optimize its performance as evidenced by the FMT. In one embodiment, the RMS spot radius for a design is calculated and averaged over a selected wavelength range to provide a value. This value, also referred to as the polychromatic RMS spot radius, is used as the FMT. The bending of the design's thick lens assembly is adjusted to determine where the polychromatic RMS spot radius is minimized and thereby determine the degree of bending that optimizes the design. By adjusting the bending of the thick lens assembly and measuring the RMS spot radius for the various curvatures of the lens elements, the designs are optimized and corrected according to performance based criteria. For example, adjusting the bending of the lens assembly to minimize the polychromatic RMS spot radius provides designs that are corrected for spherical aberration including spherochromatism.

The design optimization module 210 include routines which facilitate design optimization for systems with a plurality of lenses formed from optical materials. An exemplary procedure for optimizing two optical material designs according to performance based criteria and correcting the designs for spherical aberration including spherochromatism is as follows:

1. Pairs of optical materials that are appropriate for use with each other as lens elements in an optical design are selected based upon the primary and secondary dispersion coefficients of the optical materials. Optical designs based upon each appropriate pair of optical materials are identified (i.e. if 16 optical materials are found to be appropriate for use together as pairs, then all possible combinations of 2 from the 16 optical materials are identified).

2. Optical designs are then screened according to their power distribution criteria. For each optical design, the thin lens power of the lens elements is determined using the dispersion coefficients, and designs with undesirable power distribution criteria are discarded.

3. For each design with an acceptable power distribution, thickness is added to the lens elements and a prescription is arranged. Each design thus comprises a thick lens assembly that can be analyzed according to performance based criteria.

4. An analytical evaluation of the expected performance of each design is then performed as evidenced by a figure of merit. An exemplary FMT is the average of the analytically determined RMS spot radius over a range of wavelengths (the polychromatic RMS spot radius).

5. The bending of the thick lens assembly is adjusted to ascertain the degree of bending that offers optimized performance based upon the FMT. For example, the minimum polychromatic RMS spot radius for the design over a bending range is identified. The bending of the thick lens assembly can be indexed to the curvature of a first lens element.

6. Once the design has been optimized by adjustment of the bending of the thick lens assembly and analysis of the FMT, the focal length of the lens assembly is calculated and scaled to a specified focal length.

7. The design and its performance parameters are stored for comparison to other potential designs.

The preferred design selection procedure for three optical materials is the same as for two optical materials except that the optical materials are selected based upon their primary, secondary and tertiary dispersion coefficients and groups of three elements are analyzed as designs.

The modules and corresponding routines for optical material selection, thin lens power calculation, thickness adjustment, figure of merit determination, bending adjustment and focal length scaling are described in further detail with reference to FIG. 3.

Preferably, numerous designs are optimized and the designs, their performance parameters and other information are stored in the optical design selection module 206. Thus, the designs can be compared and selected dependent upon the needs of the application. Designs can be selected based upon various criteria such as polychromatic RMS spot radius minimization, cost, availability and fabricability. Conventional data manipulation and sorting techniques can be used to ease selection. For example, possible designs can be sorted in order of increasing RMS spot radius so that the best available design at a desired cost can be chosen.

Figure 3:
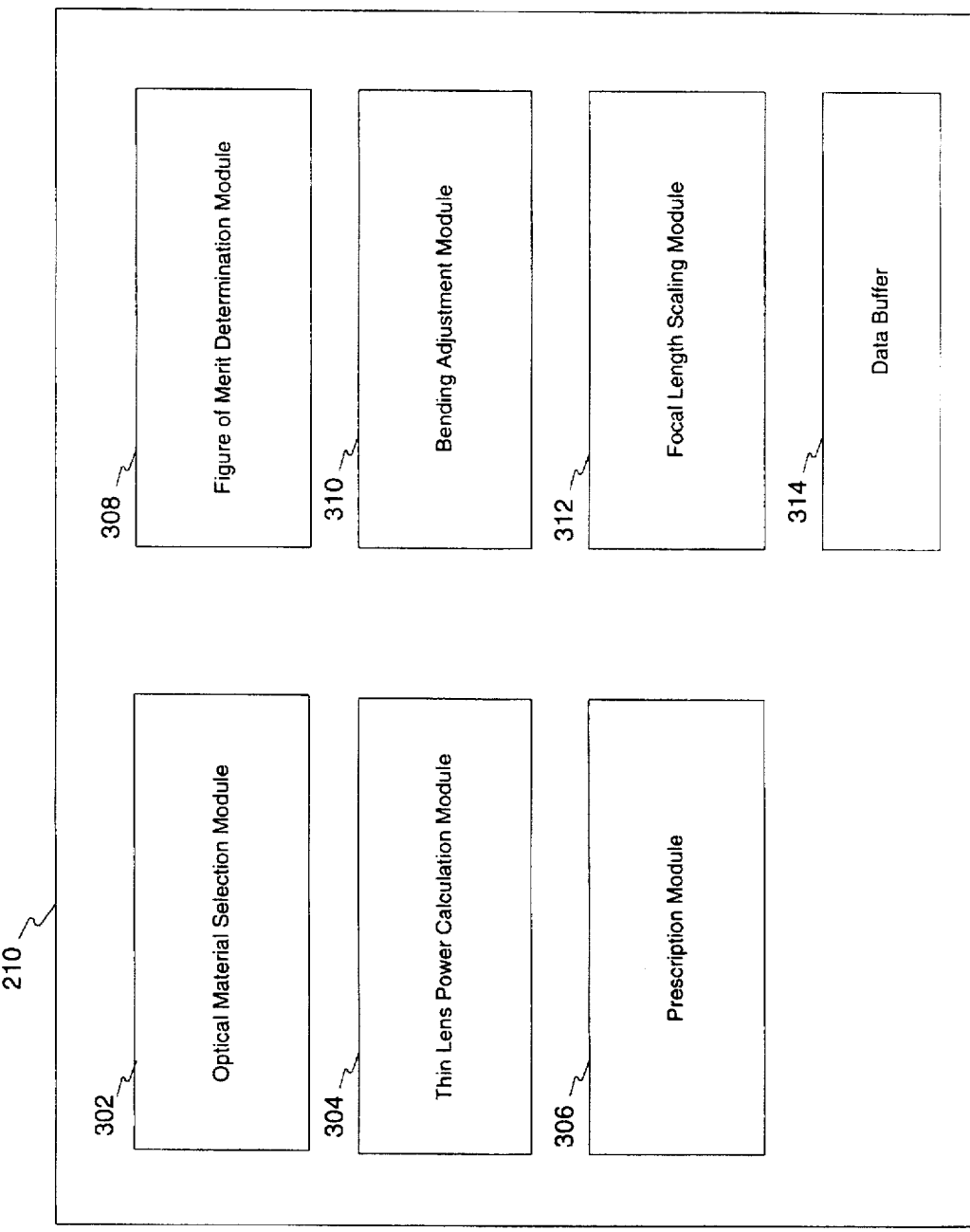
FIG. 3 is a block diagram illustrating a preferred embodiment of an optical system design optimization device in accordance with the present invention.

Referring now to FIG. 3, a preferred embodiment of the design optimization module 210 includes an optical material selection module 302, a thin lens power calculation module 304, a prescription module 306, an RMS spot radius determination module 308, a bending adjustment module 310, a focal length scaling module 312, and a data buffer 314. Although the data buffer 312 is shown as a single module with separate storage locations, a plurality of separate data buffers may be used for the various functions of the data buffer 312.

The optical material selection module 302 includes routines for identifying sets of optical materials that are appropriate for use together in a design. For two optical material designs, the set of optical materials falling within a selected region in the space defined by primary and secondary dispersion coefficients of optical materials is preferably used to identify appropriate optical material combinations. For three optical material designs, primary, secondary and tertiary dispersion coefficients of the materials are used to identify appropriate combinations. The optical material selection module 302 accesses data in the optical material information module 202 and uses the data to determine the dispersion coefficients of optical materials. Various optical materials that are appropriate for use together in an optical design are identified. The optical materials and their associated data or a pointer to such data may then be stored in the data buffer 314.

The techniques described in U.S. Pat. No. 5,020,889 can be used to identify the dispersion coefficients and to identify appropriate optical materials. The entire contents of U.S. Pat. No. 5,020,889 are hereby incorporated by reference.

The optical material selection module 302 includes routines for identifying those optical materials that are appropriate for use with each other. For two optical materials, a coordinate system with the primary dispersion coefficient and the secondary dispersion coefficient as orthogonal axes can be used to select the set of optical materials. Such selection is based upon points in the coordinate system which correspond to optical materials. Specifically, if points corresponding to first and second optical materials and the origin of the coordinate system are substantially collinear, then they are selected as appropriate for use as lens elements in a multiplet design. One way of determining whether the points are substantially collinear is to compare the ratios of their primary to secondary dispersion coefficients. If the ratios are approximately equal, then the optical materials are appropriate for use together in a design. Thus, if $$\eta_{11}/\eta_{21} = \eta_{12}/\eta_{22},  \quad \text{(Eq. 1)}$$

where $\eta_{11}$ is the primary dispersion coefficient for the first optical material, $\eta_{21}$ is the secondary dispersion coefficient for the first optical material and $\eta_{12}$, $\eta_{22}$ are the primary and secondary dispersion coefficients of the second optical material, then their points on the coordinate system are substantially collinear with each other and the origin of the coordinate system. Using the dispersion coefficients in a ratiometric equation not computationally intensive and is therefore very efficient. The optical material selection module 302 can use conventional programming techniques to perform the computations.

Other graphical or mathematical means can be used by the optical material selection module 302 to determine whether optical materials are appropriate for use together in an optical design. In coordinate based selection of optical materials, an angular sector may be defined such that, if the points for the first and second optical materials are not perfectly collinear but fall within the specified angular sector, the optical materials are included in the selected set of optical materials. For angular sector based selection, the optical material selection module 302 computes the slope of the line connecting each optical material point with the coordinate system origin and compares the slopes corresponding to each point to determine whether they are sufficiently collinear for selection. Alternatively, a reference point corresponding to a first selected optical material may be provided to the module 302 and any optical materials with points that are substantially collinear with that point and the origin are included with the first selected optical material in the selected set of optical materials. Alternatively, the arc tangent of the dispersion coefficient ratios can be determined and numerical analysis of the arc tangents can be used to select the set of optical materials.

The propriety of using three optical materials in an optical designed is determined similar to that for two optical materials. However, instead of two orthogonal axes, three orthogonal axes are presented. Thus, if the ratios $\eta_1/\eta_2, \eta_2/\eta_3, \eta_1/\eta_3$ of the primary $\eta_1$, secondary $\eta_2$, and tertiary $\eta_3$ dispersion coefficients for corresponding optical materials are substantially equal to each other, then they are appropriate candidates for use as lens elements in a multiplet design.

After using the dispersion coefficients to identify optical materials that are appropriate for use with each other as lens elements, designs are screened based upon thin lens power distribution. The thin lens power determination module 304 includes routines for screening optical designs based upon thin lens power distribution. The dispersion coefficients are used to calculate the thin lens power for lens element in a design and to calculate the power distribution for the design. Designs can then be easily screened based upon the calculated power distribution. Typically, it is desirable to minimize the thin lens power for each individual lens element in a lens multiplet and to avoid undesirable lens shapes and undesirable refractive properties. The thin lens power determination module 304 can use conventional techniques for the calculation of thin lens power and for screening designs based upon power distribution such as those described in U.S. Pat. No. 5,020,889. Designs with acceptable power distributions are stored in the data buffer 314 so that they can be further analyzed. For example, a data table including entries identifying the lens elements that comprise the design and the associated power distribution data for each acceptable system can be provided in the data buffer 314.

The prescription module 306 accesses the screened systems in the data buffer 314. For each design with an acceptable power distribution, a lens prescription is arranged and thickness is added to the lens elements to provide a thick lens assembly that can be analyzed according to performance based criteria. Preferably, the lenses are assumed to be in contact, but it is understood that a variety of configurations including those where the lenses are not in contact may be provided.

Figure 6:
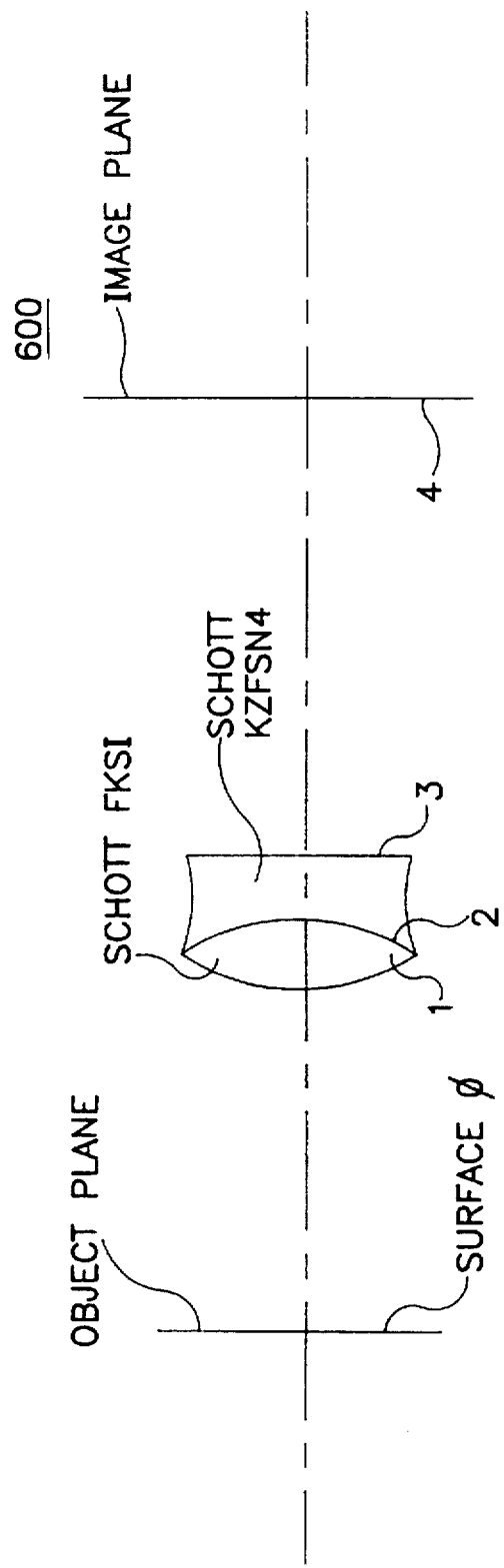
FIG. 6 is a profile drawing showing an exemplary optical design selected and optimized in accordance with the present invention.

Referring now to FIG. 6, a profile drawing of an exemplary optical design 600 subject to lens element selection and design optimization in accordance with the present invention is shown. Although it is understood that various multiplets could be selected and optimized, the shown optical design 600 is a doublet comprising lens elements respectively formed from the optical materials Schott FK51 and Schott KZFSN4. These optical materials were selected based upon their dispersion coefficients using the techniques described in connection with the optical material selection module 302 and were found to have desirable power distribution characteristics using the techniques described in connection with the thin lens power calculation module 304. Once the optical materials are selected and the designs are screened for power distribution, conventional techniques are used to set up a lens prescription and add thickness to the lens elements in the design. Provision of a lens prescription and lens element thickness addition permits analysis of the design based upon performance based criteria. The profile drawing of the optical design 600 shows the object plane, lens elements formed from Schott FK51 and Schott KZFSN4 optical materials, and the image plane. The prescription for an optical design can be defined according to parameters that govern the size and shape of its various elements. In this embodiment, the object plane is construed as surface 0 and each new surface along the focal axis is indexed sequentially. Surfaces 0 through 4 are shown. Each surface has a curvature. The curvature of the surface is the inverse of the lens radius. In the shown convention, if the center of curvature is to the right of the surface the curvature is positive, but if the center is to the left the curvature is negative. The thickness of a lens element is defined by the relative positions of the surface boundaries along the focal axis. Here, the first lens element is air and it is bounded by surfaces 0 and 1. The first lens element is also indexed or identified by the curvature of the leading (left-most as shown) boundary. Here, the object plane is flat so the curvature of surface 0 is construed to be zero. The other lens elements are the lens element comprised of the optical material Schott FK51 bounded by surfaces 1 and 2, the lens element comprised of the optical material Schott KZFSN4 bounded by surfaces 2 and 3, another air lens element bounded by surfaces 3 and 4, and the image plane 4 which has a curvature of 0 and a thickness of 0.

Referring now to FIG. 7A, an exemplary data table 700 for storing information about the lens prescription for a doublet design. The data table 700 can be stored in the data buffers 314. The prescription module 306 identifies the available designs that have been selected by the optical material selection module 302 and screened by the thin lens power calculation module 304 and stored in the data buffer 314. For the available designs, the prescription module 306 sets up a lens prescription and adds thickness to the lens elements and stores a corresponding entry in a data table 700 in the data buffer 314. The data table 700 includes information about designs such as that described regarding the exemplary design 600 of FIG. 6. Specifically, the data table 700 includes columns for the surface index (j), and the corresponding curvature (CV(j)), thickness (TH(j)), and lens materials (LM(j)) for the various surfaces. Additionally, a column for storing the FMT for each design is provided. This allows for comparison to other designs in their optimization and selection. Various alternative designs can be stored in the data table 700, such as entry 1 which corresponds to the exemplary design 600. The lens elements with thickness added are referred to as a thick lens assembly. For example, the thickened lens elements formed from the Schott FK51 and Schott KZFSN4 optical materials comprise a thick lens assembly for the exemplary design 600 shown in FIG. 6. The prescription module 306 calculates the prescription and stores the data table in the data buffer 314. In FIG. 7A, the data table 700 includes information about the lens prescription prior to optimization. As shown in the data table 700, the glasses PK51, LASF18, and SF57 are used in the exemplary triplet and the initial curvature for surface C(1) is 2.011, for surface C(2) is −2.347, for surface C(3) is −0.522, and for surfaces C(0) and C(4) is 0.

Figure 8C:
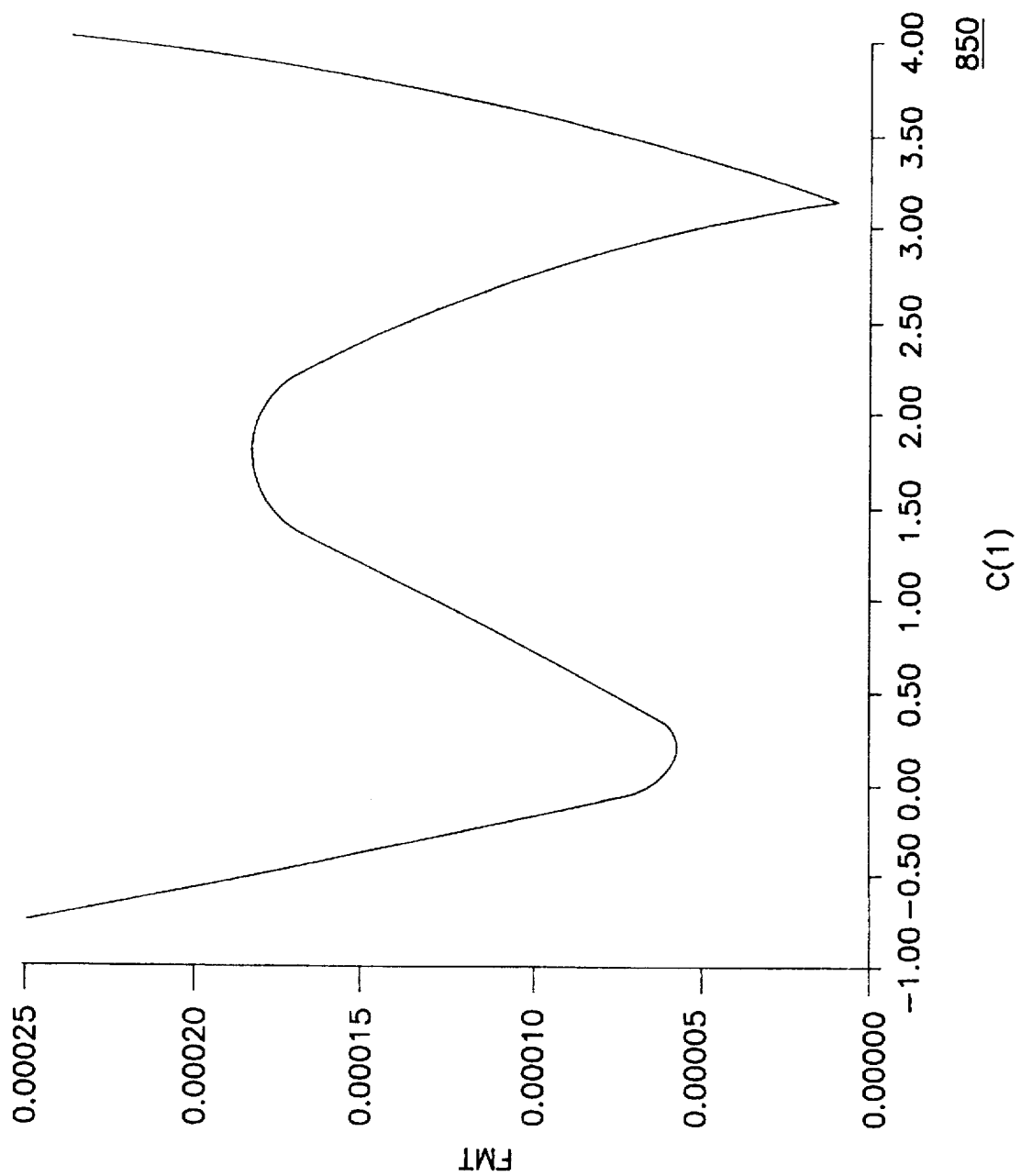
FIG. 8C is a graph illustrating bending versus figure of merit for triplet design optimization in accordance with the present invention.

Referring now to FIG. 8A, an exemplary data table 800 for triplet design optimization is shown. As with the exemplary doublet design optimization data table 700, information about a plurality of designs 1, 2, etc. can be stored in the data table 800. Additionally, for each design, columns for the surface index (j), curvature (CV(j)), thickness (TH(j)), lens materials (LM(j)) and an entry for the FMT are included. As shown in the data table 800, the initial curvature for surface C(1) is 2.940, for surface C(2) is −1.955, for surface C(3) is 1.341, for surface C(4) is −0.331 and for surfaces C(0) and C(5) is 0.

Referring again to FIG. 3, after the prescription module 306 arranges the lens prescription and adds thickness to the thin lens elements to provide the thick lens assembly, each optical design is analyzed according to performance based parameters to optimize design selection. The performance based parameters are referred to as an FMT. In one embodiment, the FMT is the analytically determined average RMS spot radius over a selected range of wavelengths (the polychromatic RMS spot radius). If the polychromatic RMS spot radius for an optical design is relatively small over a range of wavelengths, then the presence and impact of anomalous performance characteristics such as spherical aberration including spherochromatism are relatively low. The figure of merit determination module 308 includes routines for calculating the polychromatic RMS spot radius for each optical design to be analyzed.

The polychromatic RMS spot radius for each design is calculated, using the FMT determination module 308, based upon the spherical aberration coefficients of the thick lens assembly. The spherical aberration coefficients can first be determined using conventional techniques such as those described in H.A. Buchdahl, Optical Aberration Coefficients, Dover Publications Inc., New York (1968). In an exemplary embodiment, the spherical aberration coefficients are calculated using a single paraxial ray trace. Data that corresponds to the paraxial ray trace can be stored in the data buffer 314. A prescribed design comprises a series of surfaces, curvatures, thicknesses and refractive materials that can be used to trace a paraxial ray through the design. The height and the angle of the ray can be determined as the ray traverses along the focal path through each element in the design. This is used to construct mathematical relationships that provide an approximation for real design performance. These mathematical relationships, such as those described by Buchdahl, are typically provided in the form of a polynomial equations.

The polychromatic RMS spot radius can be efficiently calculated from the spherical aberration coefficients of the polynomial equations as follows:

The image plane ray height as a function of wavelength up to a seventh order approximation is:

$$Y(\lambda)=py(\lambda)\rho+t(\lambda)\rho^3+f(\lambda)\rho^5+s(\lambda)\rho^7 \qquad \text{(Eq. 2)}$$

where $\rho$=fractional pupil height of paraxial ray
$t=SA3(\lambda)$
$f=SA5(\lambda)$
$s=SA7(\lambda)$ The RMS spot radius for the valid approximation is then given by:

$$RMSr = \sqrt{\int_0^1 y^2(\lambda)\rho d\rho} \qquad \text{(Eq. 3)}$$

Let $a=py(\lambda)$, $b=t(\lambda)$, $c=f(\lambda)$, and $d=s(\lambda)$. By substituting (2) in (3) and evaluating, the RMS spot radius is:

$$RMSr = \left[ \frac{a^2}{4} + \frac{ab}{3} + \frac{b^2+2ac}{8} + \frac{bc+ad}{5} + \frac{c^2+2bd}{12} + \frac{cd}{7} + \frac{d^2}{16} \right]^{1/2} \qquad \text{(Eq. 4)}$$

If the evaluation is limited to a 5th order approximation, the terms involving d in equation (4) will vanish. In an exemplary embodiment, the average of the RMS spot radius over the spectral band of interest (the polychromatic RMS spot radius) is defined as the FMT.

The figure of merit determination module 308 stores data regarding the FMT in the data buffers 314. The FMT is associated to each analyzed optical design. Referring again to the data tables 700, 800 shown in FIGS. 7A and 8A, the FMT for the initial prescription values can be stored in association with each potential design. Conventional data storage techniques can be used to associate the determined FMT to each design. For example, columns with entries indicating the average of the determined RMS spot radius over a selected range of wavelengths or another FMT can supplement the information about the various optical designs described with reference to exemplary data table 700. These column entries can be used to compare the expected performance of various designs. For example, for the exemplary doublet design 600, the FMT for the initial prescription values is provided in the data table 700 of FIG. 7A. Here, the FMT is the polychromatic spot radius. The FMT corresponds to the performance of the entire design, but can be indexed to the curvature of the first surface. Thus, for the exemplary doublet design 600 having a first surface curvature C(1) of 2.011, the FMT is 5.28E-05. Similarly, for the exemplary triplet design, the FMT for the initial prescription values is shown in the data table 800 of FIG. 8A. For the exemplary triplet design having a first surface curvature C(1) of 2.940, the FMT (here, the polychromatic RMS spot radius) is 4.07E-05.

The bending adjustment module 310 is in communication with the data buffer 314 and the FMT determination module 308. The bending adjustment module 310 accesses the design data and includes routines for analytically altering the degree of bending of the thick lens assembly for optical designs. When the bending of the thick lens assembly is adjusted, the resultant performance of the corresponding optical design is also adjusted. The bending adjustment module 310 operates in conjunction with the FMT determination module 308 to optimize the performance of the optical design by altering the bending to find the degree of bending that offers the best analytically determined performance. For example, the lowest polychromatic RMS spot radius for a design over a bending range can be determined and then stored in the data buffer 314 for comparison and optical design optimization.

An optical design and its corresponding parameters are accessed by the bending adjustment module 310. The bending of the thick lens assembly corresponding to each optical design is adjusted by the module 310 to provide a lens assembly bending range over which the FMT for the optical design can be analyzed. The design optimization module 310 can modify optimized design by freeing all of the lens curvatures in a design (e.g. the curvatures 1, 2 and 3 in the exemplary doublet) for analytical evaluation and modification in light of very particularized performance requirements. However, the calculations that must be performed in freeing all of the lens curvatures are too numerous and complex for efficient evaluation of a high number of designs. Thus, the bending adjustment module 310 preferably uses only one surface as an independent variable. In adjusting the bending of the thick lens assembly, a first lens surface curvature (e.g. C(1)) is independently adjusted while the other surfaces (e.g. C(2), C(3)) in the thick lens assembly are dependently adjusted from the first surface curvature C(1). Thus, the dependent curvatures track the adjustment of the independent curvature and the overall thickness of the thick lens assembly does not change. Additionally, the relative spacing of the surfaces in the thick lens assembly does not change (e.g. thicknesses TH(1) and TH(2) remain unaltered in a lens doublet and thicknesses TH(1–3) remain unaltered in a lens triplet). The remaining thicknesses, such as from the object plane to the thick lens assembly (TH(0)) and the thick lens assembly to the image plane (e.g. TH(3) are allowed to float as the bending of the thick lens assembly is adjusted. Thus, for a doublet, thicknesses TH(0) and TH(3) will change (e.g., $+/-\Delta$) dependent upon the change in surface curvature C(1), and for a triplet thicknesses TH(0) and TH(4) will change.

After a change in each surface curvature in the thick lens assembly, a new paraxial ray trace provides new spherical aberration coefficients and a new figure of merit. A slight change in the back focal distance may occur, but the calculation of the polychromatic RMS spot radius (or other FMT) does not have to correct for such a change because the figure of merit is determined at the paraxial focus. Using a single paraxial ray trace to calculate FMT, single surface dependent thick lens assembly bending, and easy paraxial ray trace calculation allow for very efficient FMT determination. Thus, many thousands of potential designs can be analyzed with relatively low computational overhead.

Figure 7C:
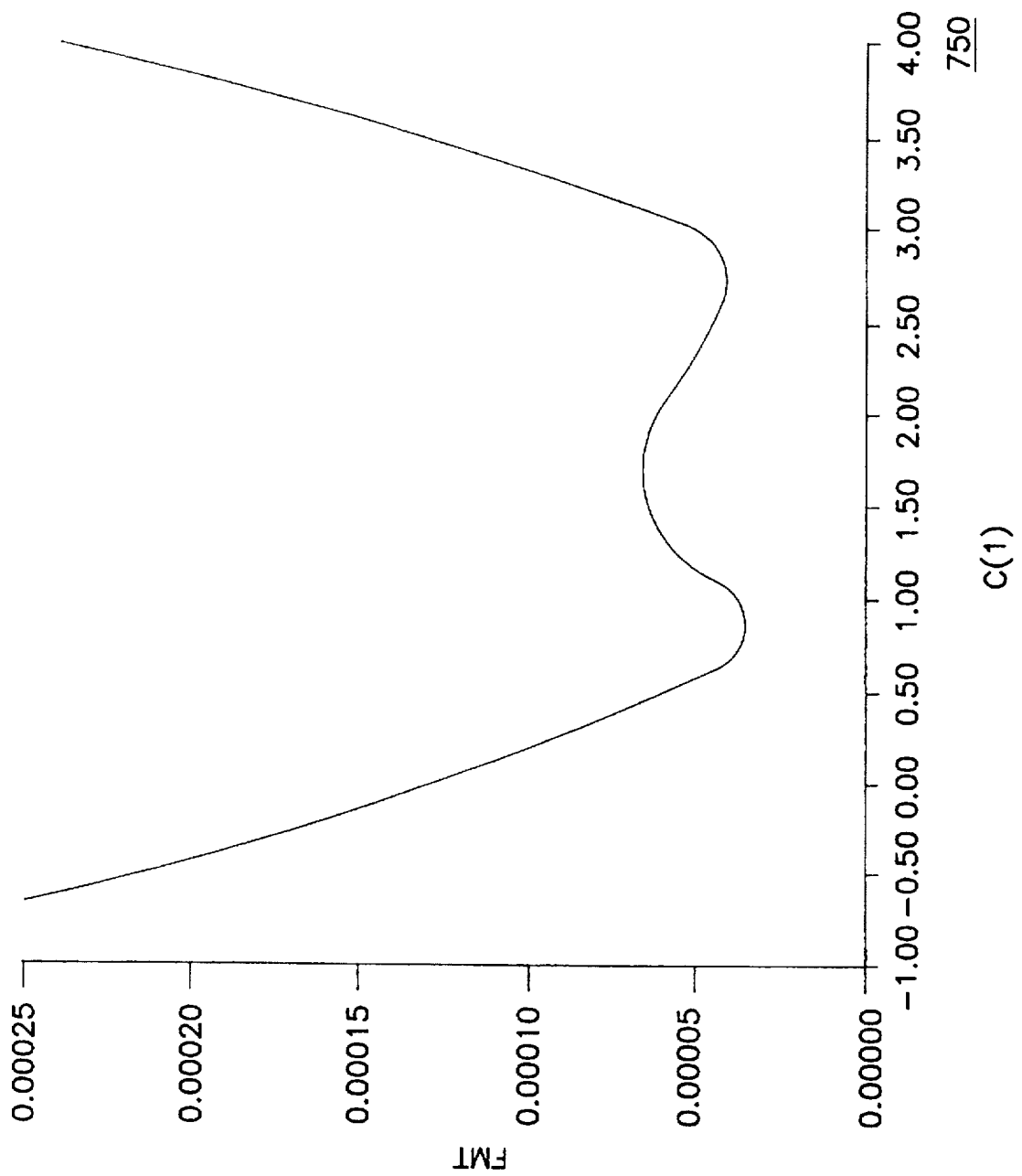
FIG. 7C is a graph illustrating bending versus figure of merit for doublet design optimization in accordance with the present invention.

Referring now to the graph 750 of FIG. 7C, although optical designs can be analytically evaluated by the design optimization module 210, an exemplary curve plotted from data provided by the FMT determination module 308 and bending adjustment module 310 indicates how a FMT such as the polychromatic RMS spot radius varies dependent upon the degree of bending of an optical design thick lens assembly. Since the degree of bending is a function of the first lens element surface curvature, the degree of bending for the assembly can be indexed to curvature C(1). As is evident in the graph 750 of FIG. 7C, plural local minima may be found in the plot of FMT vs. curvature (local maxima could also apply for certain FMTs). In this instance, the design optimization module 210 can store more than one set of optimized prescription values. Then, designs may be selected based upon an analysis of secondary criteria. Alternatively, the design optimization module 210 can store one set of optimized prescription values based upon predetermined criteria. For example, the design optimization module 210 may store optimized prescription values corresponding to the local FMT minima for a curvature that is closest to a predetermined value. Those with ordinary skill in the art will recognize the various secondary criteria that can be used to select optimized designs. As is evident from the graph 750, one local FMT minima for the exemplary doublet design corresponds to a first surface curvature C(1) of about 2.6 and another local FMT minima corresponds to a curvature of about 0.75. Similarly, referring to the graph 850 of FIG. 8C, one local FMT minima for the exemplary triplet design corresponds to a first surface curvature C(1) of about 3.15 and another local FMT minima corresponds to a surface curvature of about 0.08.

Referring now to FIGS. 7B and 8B, prescription values for the exemplary doublet and triplet designs after FMT determination and minimization are shown. For the doublet design, surface curvatures C(1–3) have each changed about 0.5. Additionally, for the surface curvature C(1) of 2.605, the FMT is 3.54E-05. For the triplet design, surface curvatures C(1–4) have each changed about 0.2 and for the first surface curvature C(1) of 3.146, the FMT is 3.04E-06.

Adjustment of the bending of the thick lens assembly and corresponding analysis of a FMT optimizes optical design performance. However, as described above adjustment of the bending of the thick lens assembly can cause a slight focal point drift along the focal axis. The focal length scaling module 312 includes routines which calculate the focal length of the adjusted design and compensates for any focal point drift by scaling the optical design to a user specified focal length. Conventional techniques are used to calculate focal length and scale the design. The performance parameters for the optical system, as scaled, are stored in the data buffer 206. Commonly scaled designs offer easier comparative evaluation.

Figure 4:
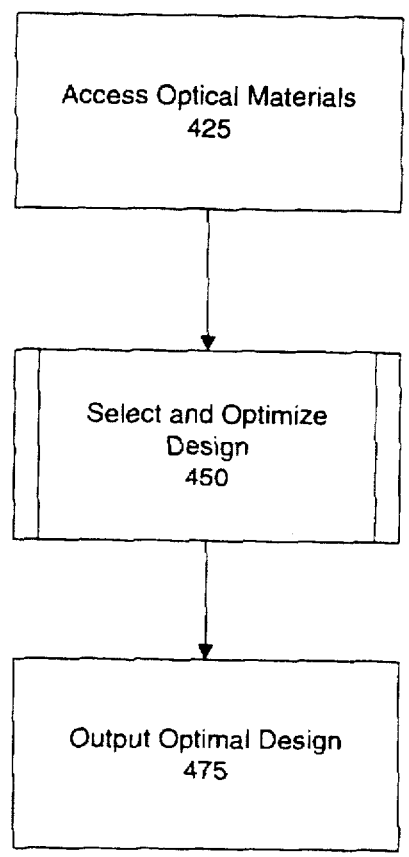
FIG. 4 is a flow chart illustrating a preferred embodiment of a method for design optimization in accordance with the present invention.

Referring now to the flow chart of FIG. 4, a preferred method of optical design optimization in accordance with the present invention is shown. In a first step 425, the available optical materials are accessed in the optical material information module 202 which includes information about the available optical materials. Information about the type of available optical materials as well as their performance characteristics such as their refractive properties is included in the optical material information module 202. Additionally, information that can be used to select optical designs that comprise lenses formed from the optical materials is included in the module 202, such as cost, availability and fabricability. Once the available optical materials have been identified, in step 450 an optical design or several optical designs that use the available optical materials are performance optimized. Design optimization is described in further detail with reference to the flow chart of FIG. 5. Once a design is optimized, it is output in step 475 for comparison to other designs which may have also been optimized.

Figure 5:
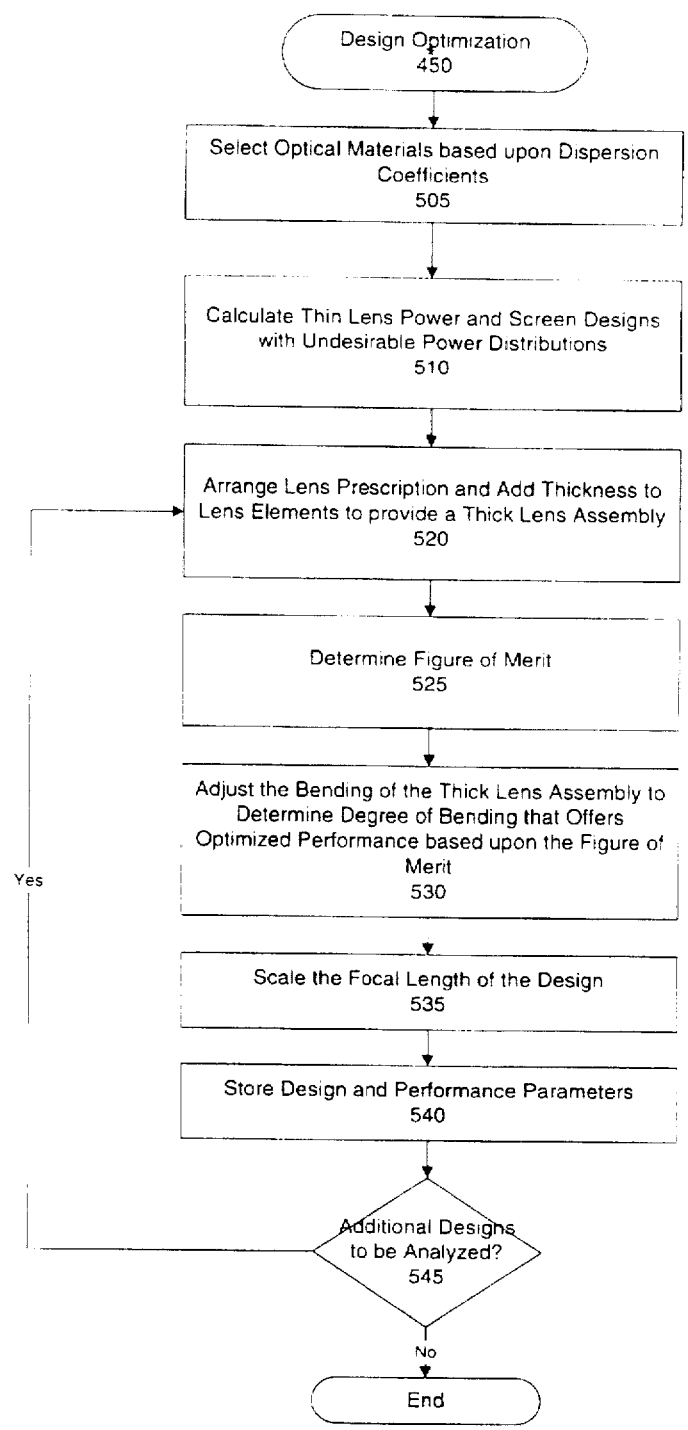
FIG. 5 is a flow chart illustrating a preferred embodiment of a method for design optimization using an analytical figure of merit in accordance with the present invention.

Referring now to the flow chart of FIG. 5, a preferred method of optical design optimization in accordance with the present invention is shown. The optimized designs comprise plural lens elements formed from various optical materials. In step 505, optical materials that are appropriate for use together as lens elements in a multiplet optical design are selected. The selection is based upon the dispersion coefficients of the optical materials. For two optical material designs, the set of optical materials falling within a selected region in the space defined by primary and secondary dispersion coefficients is used to select the optical materials. For three optical materials, the tertiary dispersion coefficients are also used to select the set of optical materials that are appropriate for use together in a lens triplet. Once optical materials that are appropriate for use in a design are selected, in step 510 the available optical designs are screened according to their power distribution criteria, again using dispersion coefficients. In step 520, a prescription is arranged and thickness is added to the lens elements of a design with acceptable power distribution criteria to provide a thick lens assembly that can be analyzed according to performance based criteria. Conventional techniques can be used to arrange the lens prescription and add thickness to the lens elements. Once the prescription is arranged, in step 525, a FMT that evidences the performance of the design is identified. In an exemplary embodiment, the FMT is the polychromatic RMS spot radius which is the average of the analytically calculated RMS spot radius of the design over a range of wavelengths. A relatively small polychromatic RMS spot radius provides designs with consistent performance without departures from ideal performance such as spherical aberration including spherochromatism (a level of departure can of course be defined as acceptable and easily integrated into design optimization). The design is optimized in step 530 using the FMT by adjusting the bending of the thick lens assembly and determining the FMT over the bending range. For example, the degree of bending that produces the lowest polychromatic RMS spot radius indicates the highest relative level of performance. In step 535 the focal length of the optimized design is calculated and the design is scaled to a specified focal length. This obviates any focal shift that results from adjusting the bending of the thick lens assembly and allows each design to be commonly scaled for comparison. In step 540, the design and its performance parameters are stored for such comparison and in step 545 it is determined whether additional designs are available for analysis. If additional designs are available to be analyzed, the next available design is processed as described above. If no additional designs are available for analysis, then the optimized designs can be compared for design selection. Conventional data storage techniques can be used to store and manipulate the information for each design. For example, the optimized designs can be sorted according to the FMT, cost, availability, or combinations thereof so that the user can make an informed design selection.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. A method of identifying optical designs that are performance optimized, the method comprising:

identifying a plurality of optical materials that are appropriate for use as lens elements in an optical design;

selecting a first optical design comprising a first lens element and a second lens element that form a first lens assembly, the first and second lens elements selected from the plurality of optical materials;

adjusting the bending of the first lens assembly to provide a bending range;

determining a figure of merit for the first optical design for a plurality of degrees of bending in the bending range, the figure of merit providing an analytical evaluation of performance; and optimizing the first optical design by analyzing the figure of merit over the bending range.

2. The method of claim 1, further comprising:

optimizing a second optical design by analyzing the figure of merit for the second optical design over the bending range; and comparing the figure of merit for the first optical design to the figure of merit for the second optical design.

3. The method of claim 1, wherein the figure of merit is the polychromatic RMS spot radius.

4. The method of claim 3, wherein the first optical system is optimized by identifying the degree of first lens assembly bending at which the polychromatic RMS spot radius is minimized.

5. The method of claim 1, wherein the step of identifying a plurality of optical materials comprises:

determining which optical materials are available; and selecting the group of optical materials based upon the dispersion coefficients of the available optical materials.

6. The method of claim 5, wherein the step of selecting a first optical design further comprises:

arranging a lens prescription for the first optical design and adding thickness to the first and second lens elements.

7. The method of claim 1, further comprising:

scaling the focal length of the first optical design after the step of optimizing the first optical design.

8. An apparatus for designing optical systems that are performance optimized, the apparatus comprising:

an optical material selection module, for identifying a plurality of optical materials that are appropriate for use as lens elements in an optical design;

a prescription module, coupled to the optical material selection module, for selecting a first optical design comprising a first lens element and a second lens element that form a first lens assembly, the first and second lens elements selected from the plurality of optical materials;

a bending adjustment module, coupled to the prescription module, for adjusting the bending of the first lens assembly to provide a bending range; and a figure of merit determination module, coupled to the bending adjustment module, for determining a figure of merit for the first optical design for a plurality of degrees of bending in the bending range, the figure of merit providing an analytical evaluation of performance, and for optimizing the first optical design by analyzing the figure of merit over the bending range.

9. The apparatus of claim 8, further comprising:
a focal length scaling module, in communication with the figure of merit determination module, for scaling the focal length of the first optical design after the first optical design is optimized.

10. The apparatus of claim 8, wherein the figure of merit determination module includes routines for optimizing a second optical design by analyzing the figure of merit for the second optical design over a bending range and comparing the figure of merit for the first optical design to the figure of merit for the second optical design.

11. The apparatus of claim 8, wherein the figure of merit determination module uses the polychromatic RMS spot radius as the figure of merit and optimizes the first optical system by identifying the degree of first lens assembly bending at which the polychromatic RMS spot radius is minimized.

12. The apparatus of claim 8, wherein the prescription module arranges a lens prescription for the first optical design and adds thickness to the first and second lens elements.

13. A system for designing optical systems that are performance optimized, the system comprising:
a memory, for storing routines and information to compare a first optical design to a second optical design; and a processor, in communication with the memory, for following the directions provided by the routines stored in memory and using the information stored in the memory to identify a plurality of optical materials that are appropriate for use as lens elements in an optical design, select a first optical design comprising a first lens element and a second lens element chosen from the plurality of optical materials that form a first lens assembly, determine a figure of merit for the first optical design for a plurality of degrees of bending of the first lens assembly, and optimize the first optical design by analyzing the figure of merit for the plurality of degrees of bending.

* * * * *